E. DUCHESNE.
PISTON PACKING.
APPLICATION FILED MAR. 19, 1917.

1,278,316.

Patented Sept. 10, 1918.

Witnesses

Inventor
E. Duchesne
by his Attorney

UNITED STATES PATENT OFFICE.

ERNEST DUCHESNE, OF MONTREAL, QUEBEC, CANADA, ASSIGNOR, BY MESNE ASSIGNMENTS, TO WEDGERITE PISTON RING CORPORATION, OF DETROIT, MICHIGAN.

PISTON-PACKING.

1,278,316.   Specification of Letters Patent.   Patented Sept. 10, 1918.

Application filed March 19, 1917. Serial No. 155,916.

*To all whom it may concern:*

Be it known that I, ERNEST DUCHESNE, a subject of the King of Great Britain, and resident of 196 Lafontaine street, Viauville, in the city and district of Montreal, in the Province of Quebec, in the Dominion of Canada, have invented certain new and useful Improvements in Piston-Packing, of which the following is the specification.

The invention relates to improvements in piston packing as described in the present specification and shown in the accompanying drawings that form part of the same.

The invention consists essentially of the novel construction, composition and arrangement of the rings in relation to one another more particularly set forth hereinafter and pointed out in the claim for novelty.

The objects of the invention are to devise a piston ring packing that will fit any groove within their own compass of expansion, to insure good service from pistons in the operation of power plants, to facilitate the removal and replacement of piston rings in repairing engines, to produce a high grade packing at a comparatively cheap price and generally to provide an efficient, serviceable and durable packing.

In the drawings, Figure 1 is a perspective view of a portion of a piston, showing the rings broken away and in cross section.

Like numerals of reference indicate corresponding parts in each figure.

Figure 1:
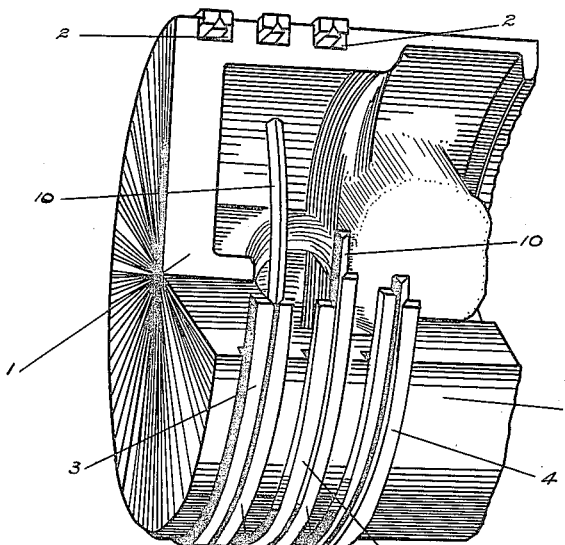
Figure 3:
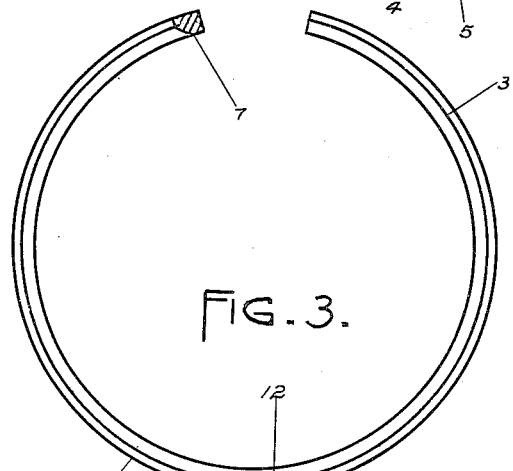
Fig. 3 is a detail of a side expansion ring.
Figure 2:
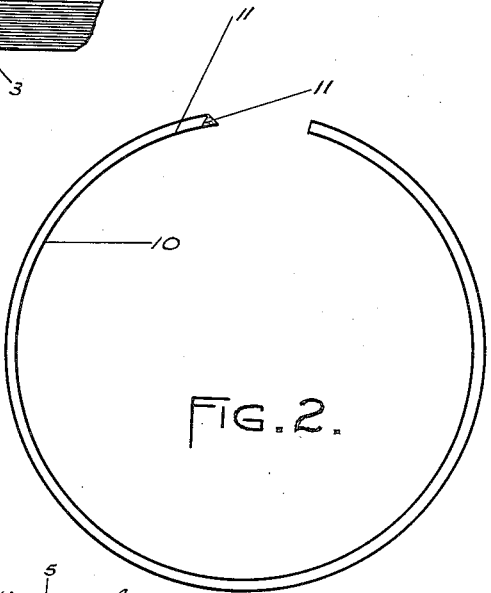
Fig 2 is a detail of the wedge ring.

Referring to the drawings, the piston 1 in the accompanying drawings is represented with the three grooves 2, each of said grooves being an endless path in the periphery of the piston as customary in engine construction.

To fill the grooves in the piston has proved a difficult task to engineers and engine builders generally, as the continuous pounding of the regular piston ring is bound to enlarge the groove and the result is a constant rattle and sure loss of pressure, and further the impossibility of filling up the groove with standardized rings makes the rattle continuous so long as the engine is used.

Figure 4:
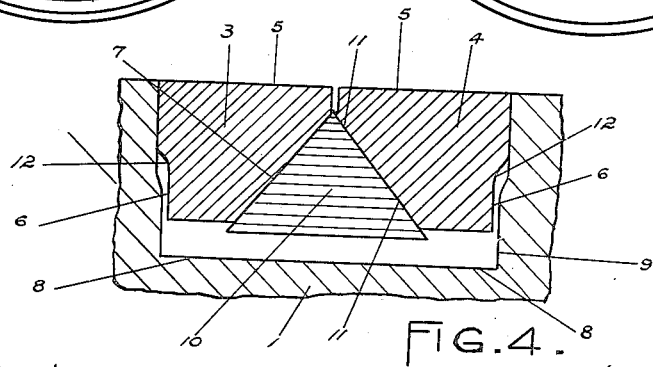
Fig. 4 is an exaggerated cross sectional view.

The wearing of the groove is clearly shown in the exaggerated view of the worm groove in Fig. 4.

It will thus be seen that a side expansion packing is necessary to keep the groove well filled and unless this is done the fluid will leak around and under the ring or rings and thus lose pressure in the operation of the machine.

This has been attempted before mainly by forcing inwardly beveled rings against outwardly beveled surfaces by a cap or other contrivance and again by forcing inwardly beveled rings outwardly from the bed of the groove, but what has not been attempted is to continuously spread two inwardly beveled rings sidewise, with no reliance on the bed of the groove for a backing, by means of a wedge of lighter weight and greater strength and to form the outer rings to take up wear in the piston groove.

In this invention there are three rings to a set two outer rings and a wedge ring therebetween, the numerals 3 and 4 indicate the outer rings, which move sidewise to engage the side walls of the annular groove in the piston, said outer rings are split to form approaching ends, so that their outer surfaces 5 engage the cylinder wall, consequent upon compression of the rings in inserting the piston in the cylinder. The side surfaces 6 of the rings 3 and 4 engage the side walls of the annular groove 2 and are formed with the slight rise 12 in the surface for the outer portion of the width, this rise remaining the same width from end to end of each ring notwithstanding the concentric shape of the rings.

These outer rings are the heaviest elements in the set as compared with the lighter wedge ring. The rise in each of the packing surfaces 6 insures the filling in of the slope or depression formed by the natural wear of the groove in the piston and in a new groove it makes no difference to the engagement of the rings. This feature is considered one of the most essential in expansion piston packing.

The inside opposing beveled surfaces 7 of said rings 3 and 4 extend from a point intermediate of the width of the inner wall 8 to a point intermediate of the depth of the inside wall 9, said bevels forming a seat for the packing wedge ring 10, which is formed triangular in cross section the two side surfaces 11 engaging the bevels 7 and separating the rings 3 and 4 moving them sidewise, as well as closing the opening caused by the separation, said sides 11 and the base being equal.

The three rings are quite clear of the bed of the groove 2 and the wedge ring 10 projects only for a portion of its depth between the rings 3 and 4, though in diameter it is greater than the inside measurements of the outer rings within the recess formed by the two bevels 7, thus there is a constant wedge pressure of the rings 3 and 4 against the side walls of the said groove 2.

The wedge ring is preferably of steel and reinforces the outer packing rings, which are preferably a soft iron of good quality, that will readily take its seat and prove simpler in the matter of lubrication, as it, to a certain extent, in a superior soft metal, lubricates itself.

There is little or no spring required in the outer packing rings, as the reinforcing hard metal ring supplies all the resiliency required to keep the side surfaces tightly to their seats against the side walls of the piston groove and this is particularly noticeable in the annularly recessed surfaces forming the rise in the outer portions of the side surfaces of the packing rings, for the softer metal will so readily work into its seat on the worn surface and be held tightly to it by the stronger wedge ring.

The constant tendency of the wedge ring to spread the outer rings is explained by the differences in measurements of their extreme outer and extreme inner surfaces, and the base surface of the wedge is originally quite clear of the inner walls 8 and not flush with said walls 8, further all inner surfaces of the rings are clear of the bed of the groove and the complete depth from the outer bearing surfaces of the outer rings to the base surface of the wedge does not measure the full depth of the groove and all reliability regarding the packing is placed on the parting of the outer rings by the natural action of the wedge and in such sidewise movement forcing the rings against the side walls of the groove, the part in the middle made by the separation of the outer rings being closed by the wedge in contact with the inner bevel surfaces of the outer rings.

Changes may be made modifying the packing described to some extent, but such will not be a departure from the spirit of the invention so long as they remain within the scope of the claim for novelty following.

What I claim is:—

In piston packing, the combination with a piston having an annular groove in the wall thereof, of a pair of transversely split rings having their outer side walls cut away for a portion of their depth to afford a clearance for said rings in spreading against worn surfaces in the walls of said grooves, said rings being of comparatively inert metal having lubricating properties and being formed with beveled inner side walls for a portion of the depth of the latter, and a spring steel ring of wedge formation transversely split and having its beveled engaging surfaces of greater depth than the aforesaid beveled surfaces to effect constant engagement with the said packing rings at the inner ends of the beveled walls.

Signed at the city of Montreal, Canada, this 28th day of February, 1917.

ERNEST DUCHESNE.

Witnesses:
E. J. FETHERSTONHAUGH,
N. FETHERSTONHAUGH.